US006829583B1

(12) United States Patent
Knapp et al.

(10) Patent No.: US 6,829,583 B1
(45) Date of Patent: Dec. 7, 2004

(54) METHOD AND APPARATUS TO DETERMINE MEAN TIME TO SERVICE

(75) Inventors: Kenneth C. Knapp, Austin, TX (US); Michael Daniel Santivenere, Austin, TX (US); Michael Joseph Sullivan, Austin, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,787

(22) Filed: Dec. 20, 1999

(51) Int. Cl.[7] .............................................. G06F 17/60
(52) U.S. Cl. ............................................. 705/5; 705/15
(58) Field of Search ................................. 705/5, 6, 15

(56) References Cited

U.S. PATENT DOCUMENTS

| | | | |
|---|---|---|---|
| 5,502,806 A | * | 3/1996 | Mahoney et al. |
| 5,506,898 A | * | 4/1996 | Costantini et al. |
| 5,682,525 A | | 10/1997 | Bouve et al. ............... 395/600 |
| 5,898,594 A | | 4/1999 | Leason et al. ......... 364/479.01 |
| 5,926,798 A | | 7/1999 | Carter ......................... 705/26 |
| 5,978,770 A | * | 11/1999 | Waytena et al. |
| 5,987,420 A | * | 11/1999 | Maeda et al. |
| 5,987,421 A | * | 11/1999 | Chuang |
| 6,173,209 B1 | * | 1/2001 | Laval et al. |

FOREIGN PATENT DOCUMENTS

WO      WO 97/15136      *  4/1997

OTHER PUBLICATIONS

Hirsch, Jerry; Disney Hopes to Cut Wait for Popular Rides at Theme Parks; Jul. 1999; Knight–Ridder Tribune Business News; Dialog copy 2 pages.*

Christos Nikolaou and Constantine Stephanidis, *Research and Advanced Technology for Digital Libraries*, Sep. 21–23, 1998, pp. 673–674.

* cited by examiner

*Primary Examiner*—Thomas A. Dixon
(74) *Attorney, Agent, or Firm*—Marilyn Smith Dawkins Dillon & Yudell LLP

(57) ABSTRACT

Expected service delays are determined from actual service data captured during service at an establishment. For each party seeking service at an establishment, the time at which the party seeks service and the time at which the party receives, or at least begins receiving, service are automatically captured, by sensors situated proximate to a cafeteria-style service line or from a data processing system-implemented waiting list. A subset of the collected data is selected utilizing defined criteria relevant to service times, such as time of day, level of service as a proportion to overall capacity, etc. An average service delay for parties is then calculated from the selected subset of collected service data. This average service delay is employed in determining an expected service delay for prospective customers, adjusting the average service delay by multiplication with a factor specified to correspond with relevant characteristics of service at the establishment, such as time of day, size of the party seeking service, etc. The projected service delay for a prospective customer is then transmitted from the establishment's Web site to the requester.

21 Claims, 4 Drawing Sheets

METHOD AND APPARATUS TO DETERMINE MEAN TIME TO SERVICE

BACKGROUND OF THE INVENTION

1. Technical Field

The present invention generally relates to collection and presentation of mean time to service data for enterprises typically having a wait associated with obtaining service and in particular to automatically collecting service data for computing estimated waiting times. Still more particularly, the present invention relates to collecting and processing service data to provide relevant historical information and projected waiting times regarding service at an establishment.

2. Description of the Related Art

Customers patronizing certain enterprises, particularly food service establishments such as cafeterias and restaurants, are frequently required to wait for service. While such waits are generally acceptable to the patrons, usually the patrons do not know how long of a wait will be required until they arrive at the establishment. In some instances, where time is of the essence, customers would like to find out how crowded an establishment is before actually going there. Moreover, customers may often wish to know how long of a wait to expect before deciding to patronize a particular establishment over others within the same general area. Such estimated wait times, when provided by an employee of the establishment, are often wildly incorrect, or based without reference to the size of the party to be served.

Finally, in establishments which maintain a running "waiting list" for service during peak business hours, no efficient means of obtaining a spot on such waiting list is generally available before arriving at the establishment. Calling ahead to the establishment may enable a party to get added to the waiting list, but delays in arrival may cause the party to miss their opportunity to be served, negating any advantage to having called ahead.

It would be desirable, therefore, to provide a mechanism for automatic collection, processing and presentation of relevant historical service data and expected wait times for service at an establishment.

SUMMARY OF THE INVENTION

It is therefore one object of the present invention to provide a method, system, and computer program product for collection and presentation of mean time to service data for enterprises typically having a wait associated with obtaining service.

It is another object of the present invention to provide a method, system, and computer program product for automatically collecting service data for computing estimated waiting times.

It is yet another object of the present invention to provide a method, system, and computer program product for collecting and processing service data to provide relevant historical information and projected waiting times regarding service at an establishment.

The foregoing objects are achieved as is now described. Expected service delays are determined from actual service data captured during service at an establishment. For each party seeking service at an establishment, the time at which the party seeks service and the time at which the party receives, or at least begins receiving, service are automatically captured, by sensors situated proximate to a cafeteria-style service line or from a data processing system-implemented waiting list. A subset of the collected data is selected utilizing defined criteria relevant to service times, such as time of day, level of service as a proportion to overall capacity, etc. An average service delay for parties is then calculated from the selected subset of collected service data. This average service delay is employed in determining an expected service delay for prospective customers, adjusting the average service delay by multiplication with a factor specified to correspond with relevant characteristics of service at the establishment, such as time of day, size of the party seeking service, etc. The projected service delay for a prospective customer is then transmitted from the establishment's Web site to the requester.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
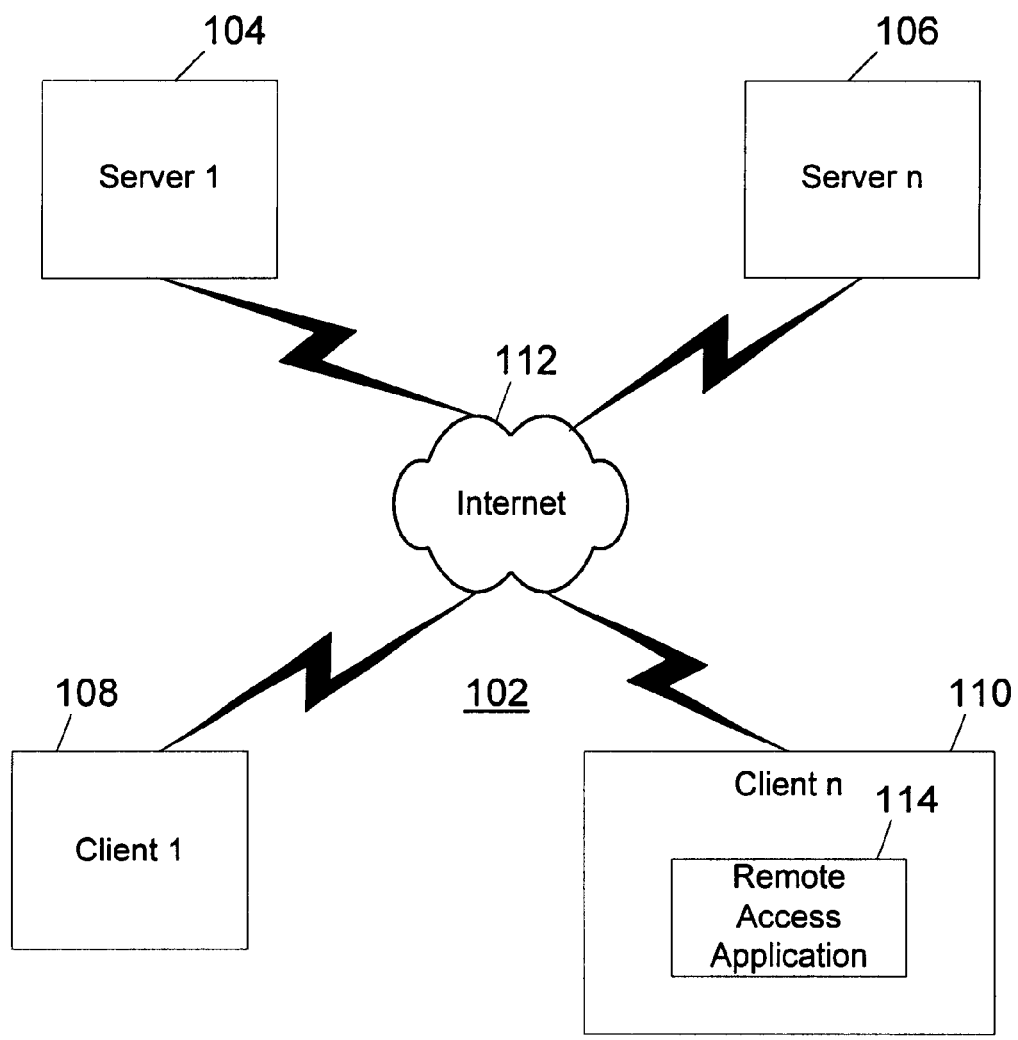
FIG. 1 depicts a data processing system network in which a preferred embodiment of the present invention may be implemented.
Figure 2:
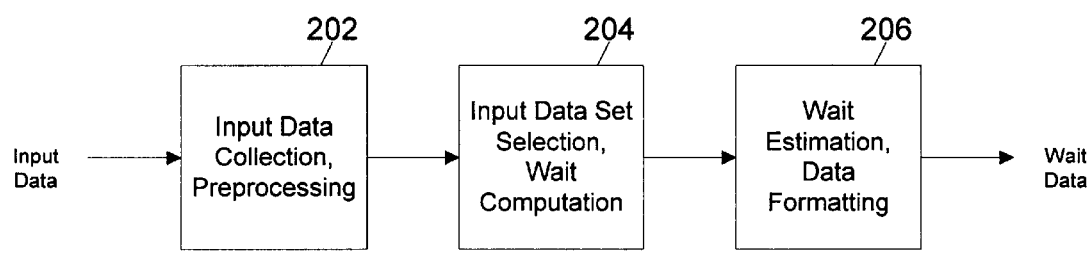
FIG. 2 is a block diagram of a mechanism for collecting and processing service wait data in accordance with a preferred embodiment of the present invention.

With reference now to the figures, and in particular with reference to FIG. 1, a data processing system network in which a preferred embodiment of the present invention may be implemented is depicted. Data processing system network 102 includes one or more servers 104–106 and one or more clients 108–110. Servers 104–106 and clients 108–110 exchange data, such as HyperText Transmission Protocol (HTTP) requests and responses or HyperText Markup Language (HTML) data and accompanying graphical image or sound data, through the Internet 112 in accordance with the known art, utilizing, for example, the Transmission Control Protocol/Internet Protocol (TCP/IP) for data transfers.

One or more servers, such as server 104, may be operated by an establishment customarily providing services which require patrons to wait during peak business hours, such as a restaurant or cafeteria. Sensor devices coupled to server 104 may provide input for automatic collection, processing, and presentation of historical wait data and estimated wait times associated with obtaining service as described in further detail below. Such historical wait data and estimated wait times may be presented, for example, on a World Wide Web site for the enterprise or establishment. One or more clients within data processing system network 102, such as client 110, may be a data processing system having access to the Internet 112 via a browser application, or a wireless device such as a mobile telephone or a handheld organizer capable of receiving data on one or more defined frequencies in a predetermined format utilizing a browser-type application. Data from a server 104 to client 110 may be transmitted over conventional hard-wired access media or conventional wireless networks connected to Internet 112.

Referring to FIGS. 2 and 3A through 3C, a block diagram of a mechanism for collecting and processing service wait data in accordance with a preferred embodiment of the present invention is illustrated, together with mock-ups of user interface diagrams for collection and presentation of service delay data in accordance with a preferred embodiment of the present invention. In the present invention, data regarding the time at which a patron seeks service in an establishment and the time at which the patron receives service at the establishment is automatically collected by a data collection and preprocessing module 202. The collected input data is then transmitted to a data set selection and wait computation module 204, which selects a relevant subset of the collected data and computes an average service delay for recent patrons from the selected subset. The average service delay of past recent patrons is then passed to a wait estimation and data formatting module 206, which projects an expected service delay based on the average service delay of recent patrons, adjusting for factors such as capacity, loading, etc., and formats the data for presentation on the establishments Web site.

For cafeterias, for example, conventional motion-sensitive sensors may be mounted in entryways to detect entry of patrons into the service line and departure of patrons from the service line. The collected data is employed to determine the number of patrons currently in the service line and the average time between entry of a patron into the service line and departure of the person from the service line. Arrival times may be captured for each patron entering the service line, and departure times for a departing patron may be captured and associated with the oldest, unmatched arrival time for a patron. The number of unmatched arrival times will indicate how many patrons are waiting in the service line and/or being served.

A relevant subset of the collected data may be selected to compute an average service delay. For example, the arrival and departure time pairs for the 20 patrons which most recently departed the service line may be selected, or arrival and departure time pairs for patrons departing the service line during the last 15 minutes. The average service delay is computed from the selected subset of collected data, and employed in projecting an expected delay for prospective patrons. Projection of an expected delay may simply involve multiplication of the computed average service delay by predetermined multiples set to correspond to identifiable conditions such as loading, time of day, etc.

For instance, an establishment having a service line operating above 75% of the service lines capacity may multiply the computed average service delay by 1.1 to determine a projected service delay for prospective patrons, to account for the decrease in service speed as the service level approaches capacity. If the current time of day is during a peak service period, such as a lunch rush, the computed average service delay may be multiplied by 0.97 to account for the increased service speed as a result of having already prepared, in anticipation the expected lunch rush, pre-selected daily specials, thus shortening service times for patrons selecting the daily special. Other factors, such as imbalances between arrival and departure rates (e.g., patrons arriving twice as fast as they are departing) may be employed in determining expected service times for prospective patrons. If appropriate, the computed average service delay need not be adjusted at all to determine a projected service delay for prospective customers.

Figure 3A:
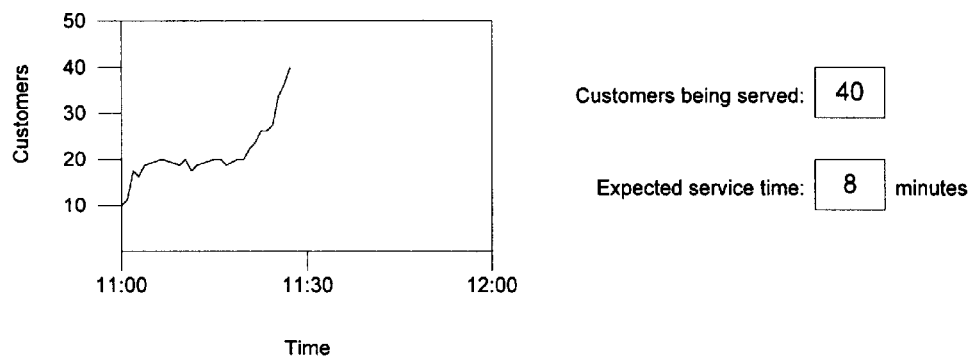
FIGS. 3A-3C depict mock-ups of user interface diagrams for collection and presentation of service delay data in accordance with a preferred embodiment of the present invention.

A mock-up of a user interface display for presenting collected and processed service delay data for a cafeteria is depicted in FIG. 3A. Such a user interface display may be presented to a prospective patron accessing the Web site for the cafeteria. Shortly before 11:30 am, for instance, the collected service data for the cafeteria may indicate that 40 patrons are waiting in the service lines, 2 are arriving every 5 seconds, and 1 is departing every 5 seconds. In the exemplary embodiment, the user interface display includes a plot of the number of patrons within the service lines of the cafeteria as a function of time, together with the number of patrons currently waiting within the service line and an average expected service delay for arriving patrons. The data within the plot and for the number of waiting patrons and average expected service delay may be updated periodically using, for example, a Java applet.

Figure 3B:
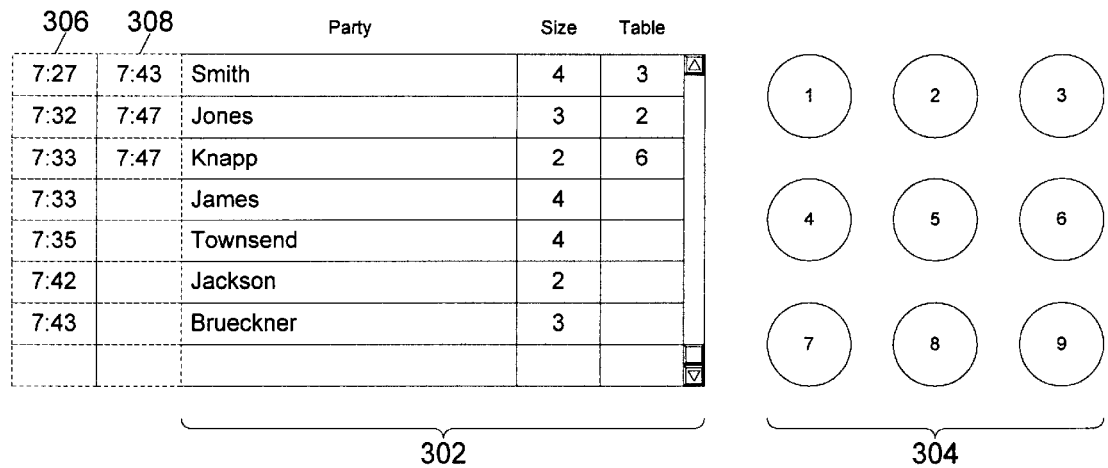

For restaurants which employ a waiting list for service, the service delay data may be automatically collected from the waiting list, which may be implemented as an application within a data processing system having, for instance, a touch-sensitive screen. FIG. 3B illustrates a user interface display for a waiting list application. The display includes an expandable list 302 in which each entry contain at least the name under which each party is entered on the waiting list and the size of the party. Whenever a new party is added to list 302, the size of list 302 automatically expands to create a new entry for an additional party. The list 302 may include both parties which are waiting to be seated and those which have been seated and are being served.

When a party on the waiting list is seated, the table number for the location at which they were seated may be added to the entry for that party within list 302. A diagram 304 of the available tables may be included in the user interface display, and a drag-and-drop interface for assigning a party to a particular table implemented. When a previously unseated party from the waiting list is assigned to a table which had been assigned to another party on the waiting list, the prior party is deleted from the list, with the corresponding entry removed from list 302.

Automatically collected for each entry added to list 302 are a time 306 at which the party was added to the waiting list 302 and a time 308 at which a party was seated. These times need not necessarily be displayed in the user interface for list 302. These times are employed to calculate an average service delay at any given time. Again, a relevant subset of the collected times may be employed, such as the times only for those parties which are on the list 302 and currently seated, the times for the last 5 parties to be seated, or the times for parties seated during the last five minutes. The expected service delay may be calculated based on the computed average service delay, for example, by multiplication by an adjustment factor. An adjustment factor may be based on the earliest time at which any currently seated party was seated, or on the size of the prospective party (e.g., one adjustment factor for parties of four or less, a different adjustment factor for parties larger than 4).

Additionally, the time at which an entry is removed from the user interface display of list 302, indicating that a new party has been seated at the corresponding table, may be automatically collected and employed with the time at which the previous party was seated to determine the time it took to serve the previous party, or an average time to serve a selected subset of parties who have been served and departed. This information may also be used in adjusting the average service delay to determine an expected service delay, if service to seated parties is exceeding a threshold amount of time.

Figure 3C:
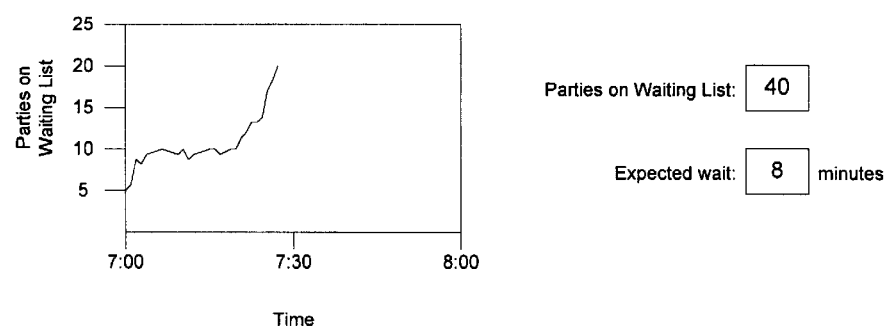

FIG. 3C illustrates a user interface display for presenting service delay information to a requester from a establishments Web site. A historical plot of the delay in seating parties, together with an indication of the number of parties waiting to be seated and the expected delay in being seated, may be displayed. Optionally, the requester may be asked to specify the number of members for their party in order to receive information on an expected service delay.

Figures 4A, 4B:
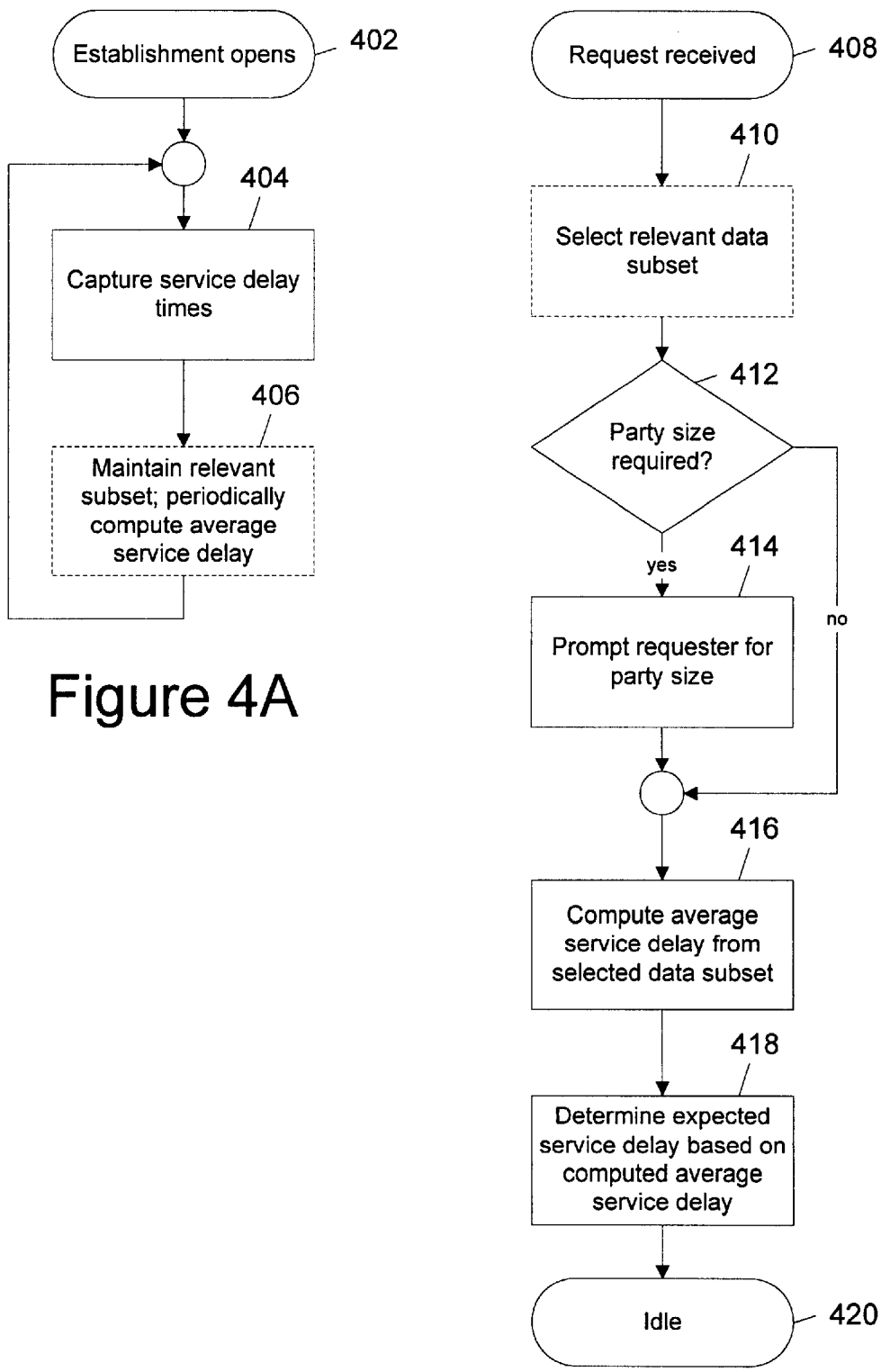
FIGS. 4A-4B are high level flowcharts for processes of automatically collecting and processing service delay data to determine an expected service delay for presentation on an establishment Web site in accordance with a preferred embodiment of the present invention.

Referring to FIGS. 4A and 4B, high level flowcharts for processes of automatically collecting and processing service delay data to determine an expected service delay for presentation on an establishment Web site in accordance with a preferred embodiment of the present invention is illustrated. FIG. 4A illustrates a process for automatically collecting and preprocessing service delay data. The process begins at step 402, which depicts an establishment opening for service on a particular day, and passes first to step 404, which illustrates capturing service delay data, or the time at which service is first sought by each patron or party and the time at which service is either first provided and/or completed. Such data may be captured by sensors at entries and exits, from a data processing system waiting list application, or from any other suitable data collection mechanism.

The process may then pass to optional step 306, which depicts maintaining the relevant subset of service delay data. For example, data which should no longer be utilized to compute average service delay under the criteria specified may be discarded, or exit times for a cafeteria may be automatically paired with the oldest unpaired entry time. Such maintenance of the relevant data subset may be performed within the data collection process or as part of determining an expected service delay in response to a request, or both. The process then returns to step 304 to continue collecting service data until the process is interrupted.

FIG. 4B illustrates a process for determining an expected service delay from collected service data. The process begins at step 408, which illustrates a request (e.g., an HTTP request invoking a Common Gateway Interface script or Java applet) for an expected service delay for a prospective customer of an establishment operating a Web site providing such information. The process may pass first to optional step 410, if necessary, which depicts selecting the relevant subset of collected service data. The process then passes to step 412, which illustrates a determination of whether the party size is required to determine an expected service delay. If so, the process proceeds to step 414, which depicts prompting the requested for the party size, and then passes to step 416. Otherwise, however, the process proceeds instead directly to step 416, which illustrates computing the current average service delay from the selected subset of collected service data.

The process passes next to step 418, which depicts determining the expected service delay for the requester based on the computed average service delay. As described above, this may involve multiplication of the computed average service delay by adjusting factors intended to account for predetermined influences on service speed. The process then passes to step 420, which illustrates the process becoming idle until another expected service delay request is received.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer-based networked environment in which a service establishment is equipped with sensors and other electronic input devices for electronically collecting service time related data that is passed to a computer, a method for electronically determining service wait times, comprising:

automatically collecting historical data relating to a time at which a party seeks service at the establishment and a time at which the party receives service at the establishment wherein said data is collected via a plurality of electronic collection devices within said establishment;

computing, from a selected subset of the collected data, an average service delay between the time at which a plurality of parties sought service at the establishment and a time at which the a plurality of parties received service at the establishment, wherein said average service delay comprises the historical data;

estimating, based on the computed average service delay, an expected service delay for a party seeking service at the establishment; and responsive to receiving a request for an estimate of said wait time, transmitting an output of the expected service delay to the requesting party, wherein: when the requesting party enters said request by connecting to a web site of the establishment that is accessible via the network environment, said output is provided within said web site; and when the requesting party enters said request in an input terminal at said establishment, said output is displayed on an output device at said establishment.

2. The method of claim 1, wherein the step of automatically collecting further comprises:

saving an entry time at which a customer enters a service line of said establishment, wherein said time is recorded utilizing an entry sensor; and saving an exit time at which the customer exits the service line, wherein said time is recorded utilizing an exit sensor.

3. The method of claim 2, wherein the step of computing an average service delay further comprises:

matching each time at which a customer exits the service line, when obtained, with an oldest unmatched time at which a customer entered the service line; and computing a difference between the time at which a customer entered the service line and a time at which the customer exited the service line for each customer within the selected subset of the collected data.

4. The method of claim 1, wherein the step of automatically collecting data further comprises:
   saving a time at which the customer is added to a waiting list for the establishment; and
   saving a time at which the customer is seated at the establishment.

5. The method of claim 4, wherein the step of computing an average service delay further comprises:
   providing an electronic output of the historical delay in a graphical chart, wherein the average delays are illustrated plotted against time.

6. The method of claim 1, wherein the step of estimating an expected service delay further comprises:
   adjusting the computed average service delay by a predetermined multiple corresponding to a plurality of possible factors influencing service speed.

7. The method of claim 1, wherein the step of transmitting the expected service delay further comprises:
   transmitting a recent history of the computed average service delay;
   transmitting a number of parties awaiting service; and
   transmitting the expected service delay for a size of the party requesting the expected service delay.

8. In a computer-based networked environment having a service establishment equipped with sensors and other electronic input devices for electronically collecting service time related data, a system for determining service wait times, comprising:
   means for automatically collecting historical data relating to a time at which a party seeks service at the establishment and a time at which the party receives service at the establishment wherein said data is collected via a plurality of electronic collection devices within said establishment;
   means for computing, from a selected subset of the collected data, an average service delay between the time at which a plurality of parties sought service at the establishment and a time at which the a plurality of parties received service at the establishment, wherein said average service delay comprises the historical data;
   means for estimating, based on the computed average service delay, an expected service delay for a party seeking service at the establishment; and
   means, responsive to receiving a request for an estimate of said wait time, for transmitting an output of the expected service delay to the requesting party, wherein: when the requesting party enters said request by connecting to a web site of the establishment that is accessible via the network environment, said output is provided within said web site; and when the requesting party enters said request in an input terminal at said establishment, said output is displayed on an output device at said establishment.

9. The system of claim 8, wherein the means for automatically collecting data relating to a time at which the party seeks service at the establishment and a time at which the party receives service at the establishment further comprises:
   means for saving an entry time at which a customer enters a service line of said establishment, wherein said time is recorded utilizing an entry sensor; and
   means for saving an exit time at which the customer exits the service line, wherein said time is recorded utilizing an exit sensor.

10. The system of claim 9, wherein the means for computing an average service delay between the time at which parties sought service at the establishment and a time at which the parties received service at the establishment further comprises:
    means for matching each time at which a party exits the service line, when obtained, with an oldest unmatched time at which a party entered the service line; and
    means for computing a difference between the time at which a party entered the service line and a time at which the party exited the service line for each party within the selected subset of the collected data.

11. The system of claim 8, wherein the means for automatically collecting data relating to a time at which the party seeks service at the establishment and a time at which the party receives service at the establishment further comprises:
    means for saving a time at which the party is added to a waiting list for the establishment; and
    means for saving a time at which the party is seated at the establishment.

12. The system of claim 11, wherein the means for computing an average service delay between the time at which parties sought service at the establishment and a time at which the parties received service at the establishment further comprises:
    means for providing an electronic output of the historical delay in a graphical chart, wherein the average delays are illustrated plotted against time.

13. The system of claim 8, wherein the means for estimating, based on the computed average service delay, an expected service delay for a party seeking service at the establishment further comprises:
    means for adjusting the computed average service delay by a predetermined multiple corresponding to a plurality of possible factors influencing service speed.

14. The system of claim 8, wherein the means for transmitting the expected service delay to the party seeking service from a Web site for the establishment further comprises:
    means for transmitting a recent history of the computed average service delay;
    means for transmitting a number of parties awaiting service; and
    means for transmitting the expected service delay for a size of a party requesting the expected service delay.

15. A computer program product within a computer usable medium for determining service wait times for patrons and allocating accommodations to patrons within a service establishment, comprising:
    instructions for automatically collecting historical data relating to a time at which a party seeks service at the establishment and a time at which the party receives service at the establishment wherein said data is collected via a plurality of electronic collection devices within said establishment;
    instructions for computing, from a selected subset of the collected data, an average service delay between the time at which a plurality of parties sought service at the establishment and a time at which the a plurality of parties received service at the establishment, wherein said average service delay comprises the historical data;

instructions for estimating, based on the computed average service delay, an expected service delay for a party seeking service at the establishment; and instructions, responsive to receiving a request for an estimate of said wait time, for transmitting an output of the expected service delay to the requesting party, wherein: when the requesting party enters said request by connecting to a web site of the establishment that is accessible via the network environment, said output is provided within said web site; and when the requesting party enters said request in an input terminal at said establishment, said output is displayed on an output device at said establishment.

16. The computer program product of claim 15, wherein the instructions for computing an average service further comprise:

instructions for saving an entry time at which a customer enters a service line of said establishment, wherein said time is recorded utilizing an entry sensor; and instructions for saving an exit time at which the customer exits the service line, wherein said time is recorded utilizing an exit sensor;

instructions for matching each time at which a party exits the service line, when obtained, with an oldest unmatched time at which a party entered the service line; and instructions for computing a difference between the time at which a party entered the service line and a time at which the party exited the service line for each party within the selected subset of the collected data.

17. The computer program product of claim 15, wherein the instructions for automatically collecting data relating to a time at which the party seeks service at the establishment and a time at which the party receives service at the establishment further comprise:

instructions for saving a time at which the party is added to a waiting list for the establishment; and instructions for saving a time at which the party is seated at the establishment.

18. The computer program product of claim 17, wherein the instructions for automatically collecting data relating to a time at which the party seeks service at the establishment and a time at which the party receives service at the establishment further comprises:

instructions for electronically displaying a graphical layout of said service establishment with each accommodation indicated thereon;

instructions for enabling a drag and drop functionality for allocation of one of said accommodations to a respective one of said patrons, wherein when a reservation is being made for a particular accommodation within the establishment, a user of said computer program may select an ID corresponding to the patron and electronically drag and drop that ID on to the accommodation, whereby the accommodation is immediately associated with the corresponding customer;

instructions for recording a time at which said customer ID is dropped on said accommodation as a time that said customer receives said accommodation, wherein only one customer ID representing a single customer or group of customers may be associated with said accommodation at a time.

19. The computer program product of claim 17, wherein the instructions for computing an average service delay between the time at which parties sought service at the establishment and a time at which the parties received service at the establishment further comprise:

instructions for providing an electronic output of the historical delay in a graphical chart, wherein the average delays are illustrated plotted against time.

20. The computer program product of claim 15, wherein the instructions for estimating, based on the computed average service delay, an expected service delay for a party seeking service at the establishment further comprise:

instructions for adjusting the computed average service delay by a predetermined multiple corresponding to a plurality of possible factors influencing service speed.

21. The computer program product of claim 15, wherein the instructions for transmitting the expected service delay to the party seeking service from a Web site for the establishment further comprise:

instructions for transmitting a recent history of the computed average service delay;

instructions for transmitting a number of parties awaiting service; and instructions for transmitting the expected service delay for a size of a party requesting the expected service delay.

* * * * *